United States Patent [19]

Smith et al.

[11] 4,364,370

[45] Dec. 21, 1982

[54] METHOD AND APPARATUS FOR SUPPLYING FLUID TO AN INTERNAL COMBUSTION ENGINE

[76] Inventors: Byron D. Smith, 7019 McCauley Trail, Edina, Minn. 55435; Terrence J. Erickson, 8186 Hames Rd. S., Cottage Grove, Minn. 55016

[21] Appl. No.: 181,849

[22] Filed: Aug. 27, 1980

[51] Int. Cl.³ .................... F02B 47/00; F02M 43/00; F02D 19/00
[52] U.S. Cl. .................. 123/575; 123/25 L; 123/25 M; 123/1 A; 123/198 A
[58] Field of Search ............... 123/25 J, 25 L, 25 M, 123/1 A, 25 R, 575, 198 A

[56] References Cited

U.S. PATENT DOCUMENTS

| | | | |
|---|---|---|---|
| 2,493,808 | 1/1950 | Garrigus | 123/25 |
| 2,525,576 | 10/1950 | Anderson | 123/25 |
| 2,554,612 | 5/1951 | Bills et al. | 123/25 |
| 2,560,213 | 7/1951 | Cannon | 123/25 |
| 2,599,985 | 6/1952 | Fox et al. | 123/25 |
| 2,667,148 | 1/1954 | Blanchard | 123/25 |
| 2,675,788 | 4/1954 | Porter et al. | 123/25 |
| 3,631,843 | 1/1972 | Yeiser | 123/25 L |
| 3,857,543 | 12/1974 | McKeen | 251/129 |
| 3,911,871 | 10/1975 | Williams et al. | 123/25 L |
| 4,096,829 | 6/1978 | Spears | 123/25 |

*Primary Examiner*—Ira S. Lazarus
*Attorney, Agent, or Firm*—Burd, Bartz & Gutenkauf

[57] ABSTRACT

An apparatus and method of introducing a fluid, as water, alcohol, or a mixture of water and alcohol, into intake air of an internal combustion engine. An electric motor drives a pump that delivers fluid under pressure to a nozzle mounted on the cover of an air cleaner above the air inlet of the carburetor. The electric energy supplied to the electric motor is modulated in a manner to operate the motor so that the pump discharges fluid at a rate that maintains the fluid to air/fuel mixture ratio substantially constant over the operating rpm of the engine. An electric control circuit is operably associated with a diaphragm assembly connected to the intake manifold and a light emitting and reflective light sensing component operable to produce an electric signal response to movement of the diaphragm that is proportional to vacuum pressure in the intake manifold. The electric signal is used to vary the width of electric energy pulses originating from the ignition system of the engine to provide output electric energy to operate the electric motor.

46 Claims, 4 Drawing Figures

METHOD AND APPARATUS FOR SUPPLYING FLUID TO AN INTERNAL COMBUSTION ENGINE

BACKGROUND OF INVENTION

It is known that high combustion temperatures of an internal combustion engine result in the formation of oxides of nitrogen, $NO_x$, which are discharged by the engine into the atmosphere. Water has been used as an anti-knock compound and to provide a cooling of the combustion process to reduce engine knock and to reduce formation of $NO_x$. Devices that inject water into the air/fuel mixture of an internal combustion engine have not been widely used in commercial and passenger vehicles having reciprocating piston internal combustion engines. One drawback to the more general use of the water injection has been the inability to precisely control the amount of water introduced into the fuel mixture under varying engine operating conditions.

In the normally aspirated internal combustion engine having spark ignition, a fuel/air mixture is drawn into an intake manifold through a carburetor. The engine intake valves admit the air/fuel mixture to the cylinders at the proper time in the engine cycle. The amount of air/fuel mixture drawn into a cylinder on a single stroke of a piston is directly dependent upon the absolute pressure of the gas in the intake manifold. The amount of air/fuel mixture varies directly with the intake pressure in the manifold and inversely with absolute gas temperature. An effect of introducing water into the air/fuel mixture is that it cools the air/fuel mixture by evaporation. This results in more power per individual piston stroke of the engine.

The intake manifold gas pressure varies in a complex manner with engine speed and throttle opening. The suction or pumping rate of the engine is proportional to engine speed or engine rpm. The carburetor throttle valve is movable with the use of external linkages in the carburetor passage to vary the vaccum pressure in the intake manifold. In Applicant's fuel supply system the fluid, such as water, alcohol, and mixed water and alcohol, is introduced into the air/fuel mixture in a modulated manner that is proportional to engine speed times the absolute gas pressure in the intake manifold. The result is that the ratio of fluid to the air/fuel mixture remains relatively constant over the operating rpm of the engine.

SUMMARY OF INVENTION

The invention is directed to a method and apparatus for introducing a fluid or a mixture of fluids into the air intake system of an internal combustion engine to facilitate the operation of the engine under all operating conditions of the engine. More particularly, the method and apparatus is used to dispense a liquid, as water, alcohol, or a mixture of water and alcohol, into either the carburetor or intake manifold of an internal combustion engine in controlled amounts which vary in accordance with the operating conditions of the engine.

The apparatus is a fluid supply system having a pump that is driven with a D.C. electric motor for pumping a fluid from a container through a nozzle operable to discharge atomized fluid into the air passage of a carburetor. A control means utilizing electrical energy pulses from the ignition system of the engine and the vacuum pressure in the intake manifold regulates the introduction of the liquid into the air intake system of the engine. The control means operably connects the D.C. power source, the electrical energy from the ignition means for the engine, and an electrical signal related to the vacuum pressure in the intake manifold, to control an electrical circuit which produces output electrical energy that is the function of the product of the electrical energy pulses produced by the ignition times an electrical signal that is proportional to the absolute or vacuum pressure in the intake manifold of the engine. The output electrical energy controls the speed of the motor which operates the pump in a manner so that the fluid is introduced into the air intake system of the engine at a rate that varies with the air/fuel mixture used by the engine under all operating conditions of the engine. The ratio of fluid to the air/fuel mixture remains relatively constant from idle to high speed operation of the engine.

One form of the invention has a fuel supply system for an internal combustion engine that operates to allow the engine to operate on either gasoline, alcohol, or a mixture of gasoline and alcohol. A fuel conversion control is operable to selectively control the supply of gasoline and alcohol to the carburetor to allow the engine to run on either gas, alcohol, or a mixture of gasoline and alcohol. The fuel supply system is adaptable to a conventional carburetor. Modifications to carburetors are not required as the fluid is introduced as a fluid/air mixture into the carburetor inlet and directed by the carburetor into the intake manifold of the engine.

An object of the invention is to provide an improved apparatus and method for introducing one or more fluids having anti-knock and cooling qualities into the air intake system of an internal combustion engine. A further object of the invention is to provide a control operable to introduce fluids into the air intake system of an internal combustion engine in response to the product of electrical energy pulses of the ignition system of the engine and an electrical signal proportional to the vacuum pressure in the intake manifold of the engine. Another object of the invention is to provide a fuel system for an internal combustion engine that can provide the engine with an air/gasoline mixture, and air/gasoline/water mixture, an air/gasoline/alcohol/water mixture, or an air/alcohol/water mixture. Yet another object of the invention is to provide a fluid supply apparatus for an internal combustion engine that introduces fluid into an air/fuel mixture and maintains a selected ratio of fluid to air/fuel mixture relatively constant over the range of operation of the engine. These and other objects and advantages of the invention are included in the embodiments of the invention hereinafter described.

IN THE DRAWINGS

DESCRIPTION OF PREFERRED EMBODIMENTS

Figure 1:
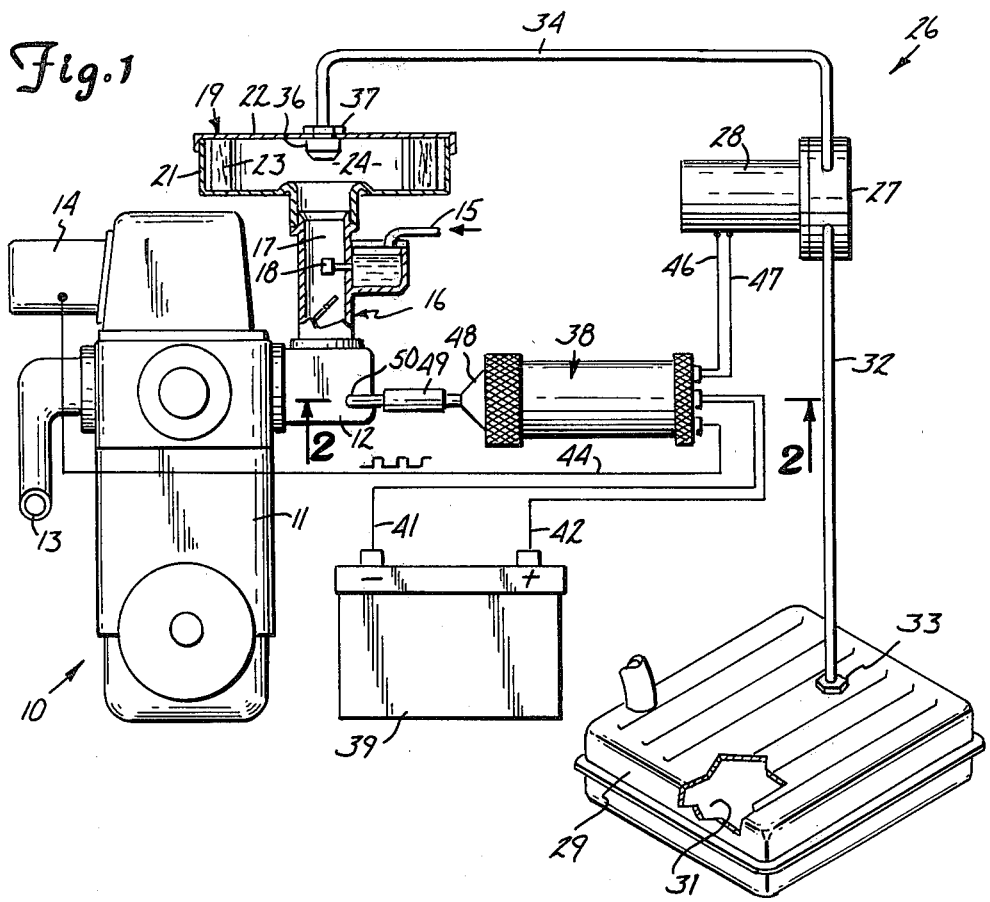
FIG. 1 is a diagram of an internal combustion engine equipped with the fuel supply system of the invention.

Referring to FIG. 1, a conventional internal combustion engine indicated generally at 10 has a block 11 having the usual cylinders accommodating pistons connected to connecting rods rotatably mounted on a crankshaft. An intake manifold 12 secured to block 11 has a chamber for accommodating an air/fuel mixture. The chamber is in communication with the conventional intake valves of the engine. An exhaust manifold 13 mounted on the opposite side of block 11 carries exhaust gases and particulates to the usual muffler and exhaust pipes. Engine 10 has an ignition system that includes spark plugs and coil 14 electrically coupled to breaker points or equivalent structure when a solid-state breakerless ignition is used. The ignition system provides timed signals or pulses of electrical energy to the spark plugs to ignite the air/fuel mixture in the engine cylinders.

A carburetor indicated generally at 16 mounted on the intake manifold 12 is operable to provide an air/fuel mixture used to run the engine. Carburetor 16 has a passage 17 for carrying air and a nozzle or jet 18 for introducing fuel, as gasoline, into the air as the air flows through passage 17. Carburetor 16 can have the usual choke and butterfly valves for controlling the flow of air through passage 17.

An air cleaner indicated generally at 19 mounted on top of carburetor 16 filters outside air before it flows to the inlet of passage 17. Air cleaner 19 has a generally pan-shaped bottom member 21 supporting a cover 22. An annular air filter 23 is located between bottom member 21 and cover 22. Filter 23 surrounds a chamber 24 open to the inlet of passage 17.

Engine 20 is equipped with a fuel supply system indicated generally at 26 of the invention. Fuel supply system 26 is operable to introduce into the air moving through the carburetor passage 17 one or more fluids, as water, having anti-knock and cooling functions. Other fluids, such as alcohol, liquid petroleum, and a water/alcohol mixture, can be introduced into the carburetor for operating the engine. Liquid petroleum (LP) fuel also may be introduced directly into the manifold 12 to operate the engine. The term "fluid", as used herein, means one or more liquids, gases, particulate matter, or a mixture of liquids and gases. The fluids include water, alcohol, LP gas, mixtures of fluids, as alcohol and water, mixtures of liquids and gases, and like liquids and gases.

Fluid supply system 26 includes a pump 27 driven by a D.C. electric motor 28. Pump 27 and motor 28 are a single unit having motor 28 mounted on an end of the pump. Pump 27 can be a rotary tube pump. Pump 27 has one or more tubes that are compressed with rollers carried by a rotating arm. The arm is connected to a drive shaft driven by motor 28. An example of a rotary tube or pulsating pump is disclosed in U.S. Pat. No. 3,386,382. Other types of fluid pumps can be used to move fluid to nozzle 36, such as a solenoid operated piston pump, positive displacement pump, or a centrifugal pump. Pump 27 is connected to a tank or container 29 for storing fluid 31. An inlet hose 32 is connected to the inlet of pump 27 and extends to the bottom of tank 29. Hose 32 extends through a cap 33 closing the inlet opening of tank 29. Other structures can be used to connect hose 32 to tank 29. For example, hose 32 can be connected to the bottom of container 29. An outlet hose 34 carries fluid from pump 27 to a nozzle 36. Nozzle 36 is mounted on the mid-portion of cover 22 and retained thereon with a nut 37. Nozzle 36 has a discharge opening facing passage 17 so that fluid dispensed by nozzle 36 is introduced into the air of the chamber 24 whereby an air and fluid mixture flows through carburetor passage 17 into manifold 12. The amount of fluid dispensed through nozzle 36 is controlled by varying the speed of the motor 28.

A control means indicated generally at 38 operates to control the speed of motor 28 in response to engine speed or rpm and the vacuum pressure in manifold 12. Control means 38 regulates the electric current supplied to motor 28 in response to and as a function of the product of the electrical energy pulses produced by the ignition system of the engine times and an electrical signal proportional to the vacuum pressure in intake manifold 12. The motor driving output current has a pulse rate that is proportional to engine speed and a pulse width of each pulse that is proportional to the vacuum pressure in intake manifold 12.

Figure 2:
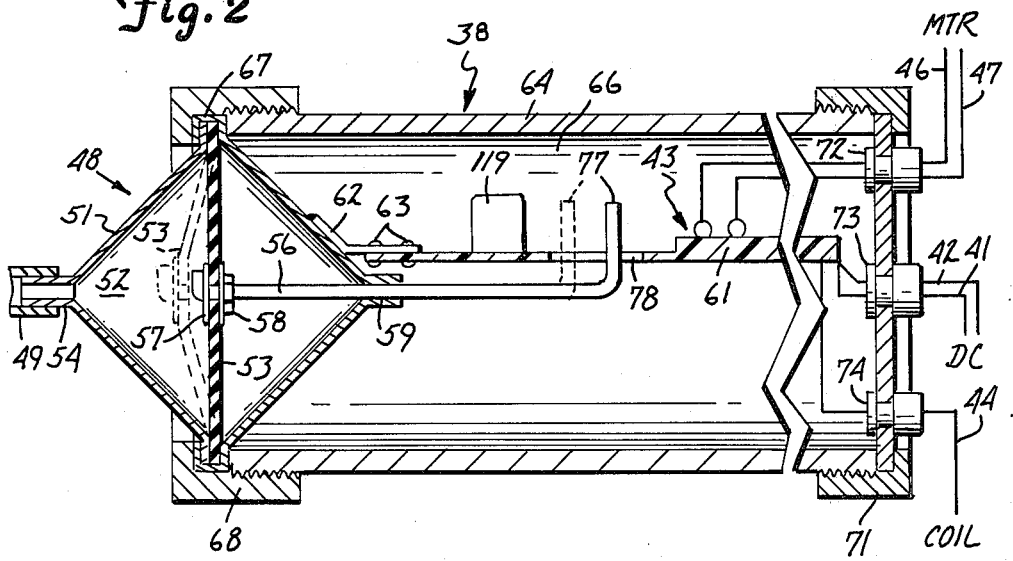
FIG. 2 is an enlarged fragmentary sectional view taken along the line 2—2 of FIG. 1.

Referring to FIG. 2, control 38 has a diaphragm assembly indicated generally at 48 connected with a hose 49 to intake manifold 12. Diaphragm assembly 48 has a two-part housing 51 having an internal chamber 52. A flexible diaphragm 53 of rubber or like material extends across chamber 52. A nipple 54 open to chamber 52 accommodates one end of hose 49. The opposite end of hose 49 is attached to a connector 50 mounted on manifold 12 and open to the interior manifold chamber. A linear rod 56 is attached to the mid-portion of diaphragm 53. A pair of nuts 57 and 58 threaded onto rod 56 clamp the rod to diaphragm 53. Rod 56 extends through an opening 59 in housing 51 adjacent a circuit board 61. A pair of brackets 62 secured to housing 51 by welds or the like are attached to circuit board 61 with nut and bolt assemblies 63.

Diaphragm assembly 48 is mounted on a cylindrical casing or housing 64 having a chamber 66 for accommodating circuit board 61 and control circuit 43 carried by board 61. As shown in FIG. 2, an annular outer portion 67 of diaphragm housing 51 engages an end of casing 64. A ring 68 threaded on casing 64 has an inwardly directed annular lip 69 that clamps annular outer portions 67 on the end of casing 64. Diaphragm assembly 48 closes one end of casing 64. The opposite end of casing 64 is closed with a cap 71 threaded onto casing 64. Cap 71 has a plurality of openings that are closed with plugs 72, 73, and 74 for accommodating the electrical lines 42, 44, 46, and 47.

The electrical control circuit 43 has a light emitting and reflective light sensing component 119, hereinafter described, mounted in front of an upwardly directed finger 77 of the outer end of rod 56. Finger 77 projects upwardly through a slot 78 in circuit board 61 and is in alignment with light 79 emitted by component 76. Finger 77 is moved relative to component 76 in response to the movement of diaphragm 53, as shown in broken lines. Finger 77 picks up scattered or reflective light. The amount of light reflected by finger 77 varies with the square of the distance between finger 77 and component 76. The reflective light sensed by component 76 provides an electrical signal proportional to the vacuum pressure in intake manifold 12. This signal is utilized by the control circuit 43 to vary the pulse width of each of the electrical output pulses of the circuit in proportion to the vacuum pressure in intake manifold 12.

Component 119 can be used to sense the position of the level of fluid in a bourdon tube or position of a diaphragm movable in response to vacuum pressure in intake manifold 12. Component 119 can be a photo interrupter counting code disk connected to a vacuum chamber actuator, bourdon tube, or diaphragm movable in response to vacuum pressure in intake manifold 12.

Figure 3:
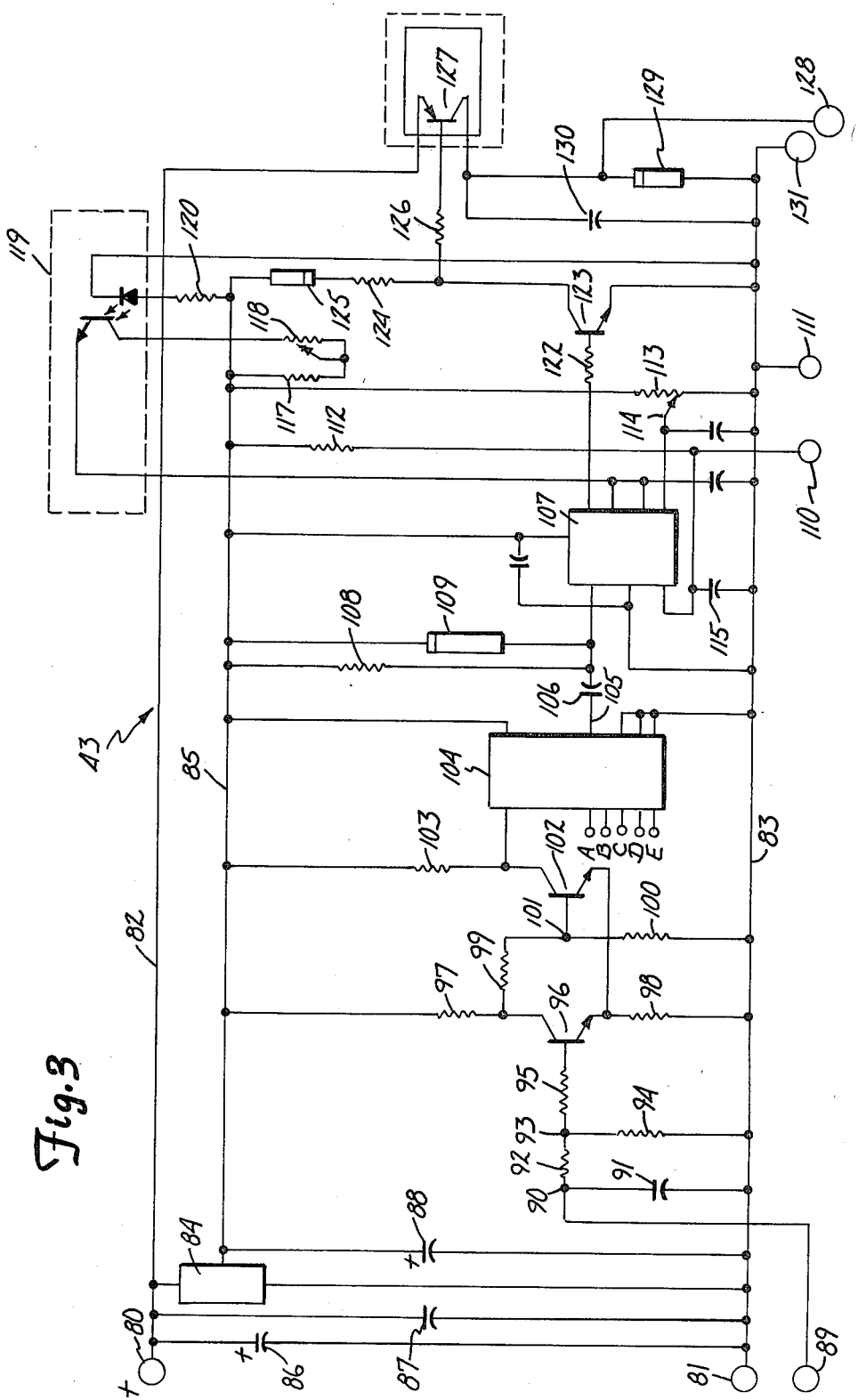
FIG. 3 is a circuit diagram of the fluid dispensing control circuit of the fluid supply system.

Referring to FIG. 3, the control circuit 43 comprises a pair of input terminals 80 and 81 which are adapted to be connected to a source of D.C. potential, such as a 12-volt storage battery normally found in automotive systems. The positive terminal 80 connects to a bus 82 and the negative terminal 81 connects to the negative bus 83. Connected between the positive and negative buses is a voltage regulator circuit 84 which may comprise a Type 2930T 8.0 voltage regulator chip manufactured and sold by the National Semiconductor Company. This voltage regulator chip tends to maintain the D.C. voltage on its output line 85 constant inspite of variations in potential which may occur across the terminals of the battery supply. Parallel capacitors 86 and 87 are also connected in parallel with the voltage regulator 84 across the D.C. supply bus and serve as low pass filters for any noise spikes which may be present and which might otherwise deleteriously affect the voltage regulator chip 84. A further capacitor 88 is connected between the regulated voltage line 85 and the negative bus 83.

A further input terminal 89 is adapted to be connected to the ignition system of the automobile and receives electric energy pulses or signals from either the distributor or the coil upon the opening of the breaker points or the equivalent event when a solid-state breakerless ignition is employed. These signals are applied to a junction point 90 to which is connected a capacitor 91 and a resistor 92. The other terminal of the capacitor 91 connects to the negative bus 83 while the remaining terminal of the resistor 92 couples to a further junction point 93 to which a further pair of resistors 94 and 95 connect. The other terminal of resistor 94 connects to the negative bus 83 while the remaining terminal of the resistor 95 is connected to the base or control electrode of a NPN transistor 96. The collector electrode of this transistor is coupled through a resistor 97 to the regulated voltage supply bus 85 and the emitter electrode is coupled through a resistor 98 to the negative bus 83.

A voltage divider including series coupled resistors 99 and 100 is coupled between the collector electrode of the transistor 96 and the negative bus. At the output junction 101 of this voltage divider there is connected the control or base electrode of a further semiconductor device or transistor 102. The collector electrode of this last-mentioned transistor 102 is coupled through a resistor 103 to the regulated voltage bus 85 and the emitter electrode of that transistor is tied directly to the emitter electrode of the first transistor 96.

The collector electrode of the transistor 102 is connected to the clock (CLK) input of a presettable divide-by-N integrated circuit 104 which may, for example, comprise a Type CD 4018 IC chip which is commercially available from a number of vendors. The factor, N, by which the frequency of the input signals is divided down is dependent upon which of the terminals A-E is connected to the data output line 105 of the IC.

A coupling capacitor 106 is arranged to couple the output from integrated circuit 104 to the trigger input terminal (pin 2) of a Type 555 IC timer chip 107. A parallel combination of a resistor 108 and a diode 109 is connected between that same trigger input terminal of the timer chip 107 and the regulated voltage bus 85. The reset terminal (pin 4) of the IC timer chip 107 is connected to a terminal pin to which various external sensors may be coupled. For example, a low water sensor or a low temperature sensor (neither shown) may be coupled between the input terminal 110 and the ground terminal 111. The reset terminal (pin 4) of the Type 555 timer chip 107 is also coupled through a resistor 112 to the regulated voltage bus 85. The control voltage for the timer chip is obtained from a potentiometer 113 which has its wiper arm 114 connected to the control input of the timer and which has its opposite terminals connected directly between the regulated voltage bus 85 and the negative or ground bus 83. The capacitor 115 connects between ground bus 83 and the reset input terminal of the timer chip 107. The period of instability of the timer chip 107 is determined by the time constant which is the product of the value of the capacitor 116 and the effective resistance of the series combination of a fixed resistor 117, a variable resistor 118 and the collector-to-emitter path of the light sensitive semiconductor portion of an optical coupler indicated by the box 119. This RC circuit connects to the pins 6 and 7 of the IC timer chip 107 and, as those skilled in the art recognize, this arrangement effectively controls the "on" time of the metastable state of the timer chip 107 once it has been triggered.

The optical input for the light sensitive semiconductor device 119 comes from a LED device whose anode electrode is coupled through a current limiting resistor 120 to the regulated voltage bus 85 and whose cathode electrode is coupled by way of a conductor 121 to the negative or ground bus 83.

The output from timer chip 107 is coupled through a resistor 122 to the base or control electrode of a transistor or semiconductor switch 123. The collector electrode of transistor 123 is coupled through a resistor 124 and a diode 125 to bus 85. The emitter electrode of the transistor 123 is connected directly to the negative bus 83.

The collector electrode of the transistor 123 is coupled through a resistor 126 to the base or control electrode of a semiconductor current control device 127, preferably a power transistor, such as a Type MJE 1092 supplied by the Motorola Semiconductor Company. The emitter electrode of power transistor 127 connects to positive bus 82 and the collector electrode of that transistor connects to an output terminal 128. A parallel combination of a diode 129 and a capacitor 130 is also connected between the collector electrode of the power output transistor 127 and the negative bus 83. The D.C. motor 28 which drives the pump 27 is adapted to be connected between the output terminal 128 and a further terminal 131 which is tied to the negative or ground bus 83.

Now that the details of the construction of the control circuit involved with the present invention have been set forth, consideration will be given to its mode of operation.

As has been indicated above, the pump motor 28 is driven at a rate which is proportional to both engine speed and the absolute vacuum pressure in the intake manifold of the engine. This D.C. motor 28 is adapted to be connected across the terminals 128 and 131 in FIG. 3. The terminals 80 and 81 of the circuit of FIG. 3 are adapted to be connected to the D.C. battery supply commonly associated with internal combustion automobile engines and the like. The input terminal 89 is, in turn, arranged to be coupled to an appropriate point in the engine's ignition system for receiving signals indicative of the firing of the engine's spark plugs. These signals are amplified and shaped by the transistor stages 96 and 102 and the resulting pulse-type signals developed at the collector electrode of the transistor 102 at a rate which is determined by the engine's speed are applied to the divide-by-N counter 104. The integrated circuit 104 effectively frequency divides the trigger pulses down to a desired rate which is determined by a jumper coupled between one of the terminals A—E of the divide-by-N circuit 104 and its data terminal 105. For a predetermined number, N, of input signals to the chip 104, it will produce a single output which is coupled through the capacitor 106 to the trigger input terminal of the Type 555 timer chip 107.

The timer chip 107 is connected up as a monostable multivibrator and, as such, each time it is triggered it produces an output pulse of a predetermined width, the width being dependent upon the RC time constant provided by capacitor 116 and the effective resistance of resistor 117 in series with potentiometer 118 and the emitter-to-collector resistance of the photosensitive transistor of the optical coupler or light sensitive device 119. As such, the finger 77 in FIG. 2 projects into the path of the light from the light emitting diode to its associated light sensitive semiconductor. As has already been mentioned, the positioning of the finger 77 modulates the light reaching the photosensitive semiconductor and, in that the finger 77 is controlled by the manifold pressure, the electrical output from transducer 119 is directly related to that pressure. It can be seen, then, that the resulting pulses on the output line from pin 3 of the timer circuit 107 are proportional in frequency to the engine speed and proportional in pulse width to the absolute vacuum pressure in the engine's intake manifold.

The pulses from the timer circuit 107 are used to control the conductivity state of a NPN semiconductor switch 123. The output of that transistor drives the power transistor 127 which, in turn, controls the flow of current from the positive voltage bus 82 through the D.C. motor connected across the terminals 128 and 131 to the negative bus 83. Hence, the fluid pump will normally be driven so that the volume of fluid introduced into the intake manifold will be determined by the engine speed and the intake manifold pressure.

As was mentioned previously, one or more sensor devices may be connected between the terminals 110 and 111. For example, a water level sensor in the tank 29 may cause a ground signal to be coupled to the reset terminal (pin 4) of the timer circuit 107. When this condition prevails, the timer circuit is prevented from firing and the pump motor is effectively stopped. Likewise, a low temperature sensor may be coupled across the terminals 110 and 111 to short these terminals together when the manifold temperature is below a certain value. This prevents water from being injected into the intake manifold at a temperature where it can possibly remain in a liquid, rather than vapor state.

The setting of the potentiometer wiper arm 114 determines the triggering threshold of the one-shot circuit 107 while the positioning of the wiper arm on the potentiometer 118 can be used to adjust the set-point for the width of the pulses therefrom. The variations in the impedance of the optical device 119, then, add to the resistance of the potentiometer 118 in determining the ultimate pulse width of the timer output.

Figure 4:
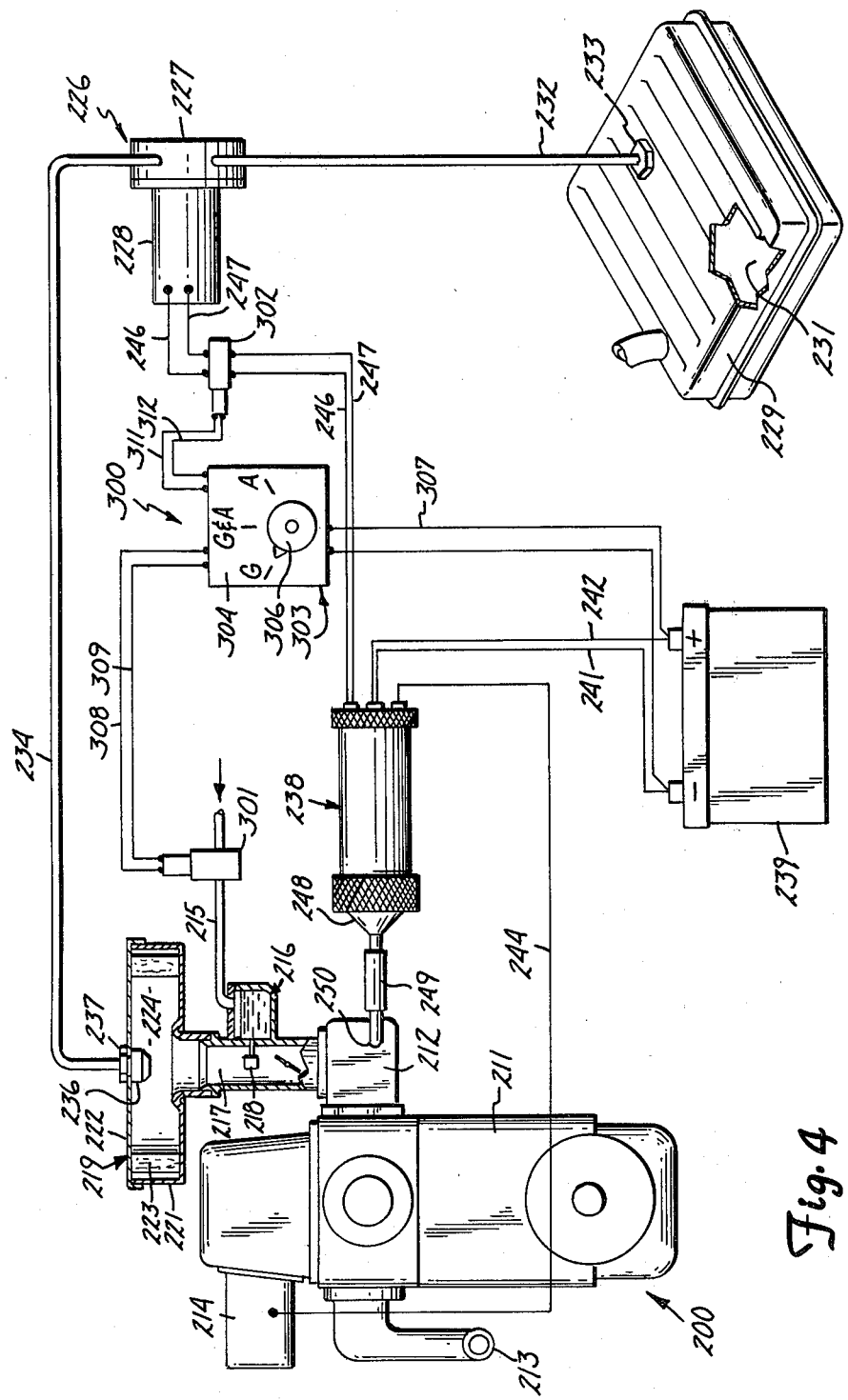
FIG. 4 is a diagram of an internal combustion engine equipped with a gasoline-alcohol fuel supply system of the invention.

Referring to FIG. 4, there is shown a modification of the fuel supply system indicated generally at 226. Fuel supply system 226 is operable to introduce a mixture of gas and alcohol into the manifold 212 or cut off the gas supply so that the only alcohol or mixture of alcohol and water is supplied to manifold 212. Fuel supply system 226 is similar to fuel supply system 26, shown in FIGS. 1-3 and described herein. The structures of system 226 that are identical to the structures of system 26 have the same reference numbers with the prefix 2. Fuel supply system 226 has a fuel conversion control indicated generally at 300 operable to control the supply of fluid and gasoline to the carburetor 216.

Fuel conversion control 300 has a solenoid operated valve 301 interposed in gasoline line 215. Valve 301 is operable to either open or close line 215 to control the flow of gasoline to carburetor 216. A solenoid switch or relay 302 is interposed in electrical lines 246 and 247 leading to pump motor 228. Switch 302 has on and off positions to control the supply of electrical energy to motor 228. Switch 302 can be a control for current control device 227. The solenoid operated valve 301 and switch 302 are connected to a switch unit indicated generally at 303. Preferably, switch unit 303 is located on the dashboard or panel of the vehicle. Switch unit 303 has a housing 304 enclosing switches (not shown). A control knob 306 is rotatable to actuate the switches within housing 304. A line 307 connects switch unit 303 with a power source, such as the 12-volt D.C. battery of the vehicle. Lines 308 and 309 connect switch unit 303 to the solenoid operated valve 301. Lines 311 and 312 connect the switch unit 303 to the solenoid operated switch 302.

Control knob 306 can be moved to three positions to control the fuel supply directed to carburetor 216. Control knob 306 can have a fourth "off" position wherein fluid and the gasoline supplied to carburetor 216 are cut off. When control knob 306 is in its first position, the solenoid operated valve 301 is open. Switch 302 is off so that the gasoline is free to flow to carburetor 216 and pump motor 228 is not operated. When knob 306 is moved to a second or gas and alcohol position, switch 301 is open and switch 302 is closed so that gasoline is free to flow to the carburetor 216 and the pump motor 228 is operated to deliver alcohol or like fluids to the carburetor 216. The switch knob 306 can be moved to a third position wherein only the fluid, such as alcohol, is delivered to carburetor 216. The solenoid operated valve 301 is closed thereby stopping the flow of gasoline to carburetor 216. The switch 302 is closed so that electrical energy causes pump motor 228 to operate to deliver fluid to nozzle 236. Fluid is dispensed through nozzle 236 into passage 217 of carburetor 216 whereby an alcohol and air mixture is supplied to intake manifold 212 to operate the engine.

The embodiments of the invention in which an exclusive property or privilege is claimed are defined as follows:

1. An apparatus for supplying a second fluid fuel intake air used by an internal combustion engine having an intake manifold accommodating a first fluid fuel and ignition means producing electrical energy pulses in timed relation to the speed of the engine comprising: container means for storing a second fluid fuel, nozzle means for discharging the second fluid fuel to provide an air and first and second fluid fuel mixture in the intake manifold, pump means operable to pump the second fluid fuel under pressure from the container means to said nozzle means, an electric motor operable to drive the pump means, means to sense the vacuum pressure of gas in the intake manifold, and control means operably associated to the means to sense the vacuum pressure in the intake manifold and produce an electrical signal in proportion to the vacuum pressure of the gas in said intake manifold, said control means having means operable to provide output electric energy to operate the electric motor as a function of the product of said electric energy pulses of the ignition means and the electric signal that is proportional to said vacuum pressure in the intake manifold, whereby said electric motor operates to drive the pump means so as to maintain a substantially constant ratio of the first and second fluid fuels relative to each other and to air in the intake manifold over the operating rpm of the engine.

2. The apparatus of claim 1 wherein: the means to sense the vacuum pressure of gas in the intake manifold includes first means movable in response to changes in vacuum pressure of the gas in the intake manifold, and second means connected to said first means and movable therewith, said means operable to provide an electric current having means for sensing the position of the second means and producing electrical information which varies according to the sensed position of the second means, said electrical information being proportional to the vacuum pressure of the gas in the intake manifold.

3. An apparatus for supplying fluid to intake air used by an internal combustion engine having an intake manifold and ignition means producing electrical energy pulses in timed relation to the speed of the engine comprising: container means for storing a fluid, nozzle means for discharging fluid to provide an air and fluid mixture in the intake manifold, pump means operable to pump fluid under pressure from the container means to said nozzle means, an electric motor operable to drive the pump means, means to sense the vacuum pressure of gas in the intake manifold, said means to sense the vacuum pressure of the gas in the intake manifold includes a diaphragm assembly having a housing with an enclosed chamber, a flexible diaphragm extended across said chamber, said diaphragm being mounted on said housing, means connecting said housing and intake manifold whereby the vacuum pressure in said manifold is in communication with said chamber causing the diaphragm to move in said chamber in response to changes of said vacuum pressure, rod means connected to and movable with said diaphragm, said means operable to provide an electric current having means for sensing the position of the rod means and providing electrical information which varies according to the sensed position of the rod means whereby the electrical information is proportional to the vacuum pressure of gas in the intake manifold, said means for sensing the position of the rod means includes light emitting and reflective light sensing means, and control means operably associated to the means to sense the vacuum pressure in the intake manifold and produce an electrical signal in proportion to the vacuum pressure of the gas in said intake manifold, said control means having means operable to provide output electric energy to operate the electric motor as a function of the product of said electric energy pulses of the ignition means and the electric signal that is proportional to said vacuum pressure in the intake manifold, whereby said electric motor operates to drive the pump means so as to maintain a substantially constant ratio of fluid to air in the intake manifold over the operating rpm of the engine.

4. The apparatus of claim 3 wherein: said rod means includes finger means located adjacent and movable relative to the light emitting and reflective light sensing means whereby movement of the finger means results in changes in the electrical information.

5. The apparatus of claim 3 including: casing means having a chamber, means to mount the diaphragm assembly on the casing means, said control means being located in the chamber of the casing means.

6. The apparatus of claim 5 including: support means connected to the diaphragm assembly for carrying the control means and locating the control means in said casing chamber.

7. The apparatus of claim 3 including: casing means having a chamber, means to mount the means to sense the vacuum pressure of the gas in the manifold on the casing means, and support means for locating the control means in said casing chamber.

8. The apparatus of claim 7 wherein: said means to sense the vacuum pressure of the gas in the manifold comprises a diaphragm assembly mounted on the casing means, said support means being attached to the diaphragm assembly and extended into the casing chamber.

9. The apparatus of claim 3 wherein: the electric motor is a D.C. electric motor operable to drive the pump at different speeds determined by the electric current supplied to the D.C. electric motor by the control means.

10. The apparatus of claim 3 wherein: the engine includes a carburetor operatively associated with the intake manifold, said carburetor having a passage for directing an air/fuel mixture into the manifold and an air cleaner mounted on the carburetor, said nozzle means being mounted on the air cleaner in a location whereby the nozzle means directs fluid into the passage of the carburetor.

11. The apparatus of claim 3 wherein: the means of said control means includes circuit means operable to produce a pulsing signal related to the electric energy pulses of the ignition means, means to provide said electric signal, said electric signal operable to vary the width of said pulsing signal, and means responsive to said pulsing signal to provide said output electric energy to said electric motor.

12. An apparatus for supplying fluid to intake air used by an internal combustion engine having an intake manifold and ignition means producing electrical energy pulses in timed relation to the speed of the engine comprising: container means for storing a fluid, nozzle means for discharging the fluid to provide an air and fluid mixture in the intake manifold, pump means operable to pump the fluid under pressure from the container means to said nozzle means, an electric motor operable to drive the pump means, means to sense the vacuum pressure of the gas in the intake manifold, and control means operably associated with the means to sense the vaccuum pressure in the intake manifold and produce an electrical signal in proportion to the vacuum pressure of the gas in the intake manifold, said control means having means operable to provide output electric energy to operate the electric motor as a function of the product of said electric energy pulses of the ignition means and the electric signal that is proportional to said vacuum pressure in the intake manifold, whereby said electric motor operates to drive the pump means so as to maintain a substantially constant ratio of fluid to air in the intake manifold over the operating rpm of the engine, said means of said control means including circuit means operable to produce a pulsing signal related to the electric energy pulses of the ignition means, means to provide said electric signal, said electric signal operable to vary the width of said pulsing signal, and means responsive to said pulsing signal to provide said output electric energy to said electric motor, said means to provide said electrical signal comprises light emitting means projecting light toward the means to sense the vacuum pressure, and means to sense light reflected by said means to sense the vacuum pressure and provide said electric signal.

13. The apparatus of claim 12 wherein: the engine includes a carburetor operatively associated with the intake manifold for directing an air/gasoline mixture to said manifold, line means for carrying gasoline to said carburetor, first means operable to stop the flow of gasoline to said carburetor, second means to turn off the electric energy operating the electric motor, and control means associated with said first means and second means to selectively actuate said first and second means to allow gasoline to flow to said carburetor and turn off the electric energy operating the electric motor, to allow gasoline to flow to said carburetor and allow said electric energy to operate the electric motor, or to stop the flow of gasoline to said carburetor and allow said electric energy to operate the electric motor.

14. The apparatus of claim 13 wherein: the first means is a solenoid operated valve located in the line means to control the flow of gasoline in said line means, said second means is a solenoid operated switch which operates to control the electric energy for the electric motor, and said control means is the switch means operable to control the solenoid operated valve and solenoid operated switch.

15. The apparatus of supplying a second fluid fuel to the intake air used by an internal combustion engine having an intake manifold accommodating a first fluid fuel, and ignition means producing electrical energy pulses in timed relation to the speed of the engine comprising: first means providing a supply of a second fluid fuel, second means for introducing the second fluid fuel into air to provide a first and second fluid fuel and air mixture in said intake manifold, third means operable to move the second fluid fuel from said supply of second fluid fuel to said second means, power means for operating the third means, means to sense the vacuum pressure of gas in the intake manifold, and control means operably connected to the means to sense the vacuum pressure of gas in the intake manifold and produce an electric signal proportional to said vacuum pressure, said control means having means operable to provide output energy to operate the power means and modulate the operation of the power means as a function of the product of the electrical energy pulses of the ignition means and said electric signal, whereby said power means operates the third means so as to maintain a substantially constant ratio of the first and second fluid fuels relative to each other and to air in the intake manifold over the operating rpm of the engine.

16. The apparatus of claim 15 wherein: the means to sense the vacuum pressure of gas in the intake manifold includes movable means that change location in response to change in vacuum pressure of gas in the intake manifold, and means connected to said movable means and movable therewith, said means operable to provide output energy having means for sensing the position of the means connected to the movable means and producing electrical information which varies according to the sensed position of the means connected to the movable means, said electrical information being proportional to the vacuum pressure of the gas in the intake manifold.

17. The apparatus of claim 15 wherein: the means to sense the vacuum pressure of gas in the intake manifold includes a diaphragm assembly having a housing with an enclosed chamber, a flexible diaphragm extended across said enclosed chamber, said diaphragm being mounted on said housing, means connecting said housing and intake manifold whereby the vacuum pressure of the gas in said manifold is in communication with said chamber causing the diaphragm to move in said chamber in response to changes in said vacuum pressure, means connected to and movable with said diaphragm, said means operable to provide electric current having means for sensing the position of said means connected to and movable with said diaphragm and provides electrical information which varies in accordance with said sensed position of the means connected to and movable with said diaphragm, whereby the electrical information is proportional to the vacuum pressure of gas in the intake manifold.

18. The apparatus of claim 17 wherein: the means for sensing the position of the means connected to and movable with the diaphragm includes light emitting and reflective light sensing means.

19. The apparatus of claim 18 wherein: said means connected to and movable with said diaphragm includes finger means located adjacent and movable relative to the light emitting and reflective light sensing means, whereby movement of the finger means results in changes of the electrical information.

20. The apparatus of claim 18 including: casing means having a chamber, means to mount the diaphragm assembly on the casing means, said control means being located in the chamber of the casing means.

21. The apparatus of claim 20 including: support means connected to the diaphragm assembly for carrying the control means and locating the control means in said casing chamber.

22. The apparatus of claim 15 including: casing means having a chamber, means to mount the means to sense the vacuum pressure of gas in the intake manifold on the casing means, and support means for locating the control means in said casing.

23. The apparatus of claim 22 wherein: said means to sense the vacuum pressure of the gas in the manifold comprises a diaphragm assembly mounted on the casing means, said support means being attached to the diaphragm assembly and extended into the casing chamber.

24. The apparatus of claim 15 wherein: the power means is a D.C. electric motor operable to vary the operation of the third means in response to said output energy of the control means.

25. The apparatus of claim 15 wherein: the engine includes a carburetor mounted on the intake manifold, said carburetor having a passage for directing air/fuel mixture into the intake manifold and an air cleaner mounted on the carburetor, said second means being mounted on said air cleaner in a location wherein the second means directs fluid into the passage of the carburetor so that fluid is mixed with air.

26. The apparatus of claim 15 wherein: the means of said control means includes circuit means operable to produce a pulsing signal related to the electric energy pulses of the ignition means, means to provide said electric signal, said electric signal operable to vary the width of said pulsing signal, and means responsive to said pulsing signal to provide said output electric energy to said electric motor.

27. The apparatus of claim 26 wherein: the means to provide said electrical signal comprises light emitting means projecting light toward the means to sense the vacuum pressure, and means to sense light reflected by said means to sense the vacuum pressure and provide said electric signal.

28. An apparatus for introducing a second liquid fuel to intake air moving into a carburetor accommodating a first liquid fuel operable to mix air and said first and second liquid fuels to provide an air/fuel mixture to an intake manifold of an internal combustion engine having ignition means producing electrical energy pulses in timed relation to the speed of the engine comprising: container means for storing a second liquid fuel, nozzle means for discharging said second liquid fuel, nozzle means for discharging said second liquid fuel into the intake air, pump means operable to pump said second liquid fuel from the container means to the nozzle means whereby said second liquid fuel is discharged by the nozzle means into the intake air, an electric drive means operable to drive said pump means, means to sense the vacuum pressure of gas in the intake manifold, and provide information proportional to said vacuum pressure, and control means operable to provide an electrical signal using said information which is proportional to said vacuum pressure of gas in the intake manifold and output electric energy to operate the electric drive means as a function of the product of said electric energy pulses of the ignition means and the electrical signal whereby the electric drive means operates the pump means so as to maintain a substantially constant ratio of said first and second liquid fuels relative to each other and to air in the intake manifold over the operating rpm of the engine.

29. The apparatus of claim 28 wherein: the means to sense vacuum pressure of the gas in the intake manifold includes movable means movable in response to changes in vacuum pressure of the gas in the manifold, said control means having light emitting means located adjacent the movable means projecting a light toward the movable means, and means to sense light reflected from the movable means and provide said electrical signal.

30. The apparatus of claim 29 wherein: said movable means includes a diaphragm.

31. The apparatus of claim 28 wherein: the means to sense the vacuum pressure in the gas in the intake manifold includes a diaphragm assembly having a housing with an enclosed chamber, a flexible diaphragm extended across said chamber and mounted on the housing, means connecting said housing with the intake manifold whereby changes in the vacuum pressure in said manifold cause movement of said diaphragm, and movable means connected to and movable with said diaphragm providing said information proportional to said vacuum pressure.

32. The apparatus of claim 31 wherein: said control means includes light emitting means projecting light toward the movable means, and means to sense light reflected by the movable means and provide said electrical signal.

33. The apparatus of claim 32 including: casing means having a chamber, and means to mount the diaphragm assembly on the casing means, said control means being located in the chamber of the casing means.

34. The apparatus of claim 32 wherein: the electric drive means is a D.C. electric motor.

35. The apparatus of claim 28 wherein: the control means includes circuit means operable to produce a pulsing signal related to the electric energy pulses of the ignition means, means to provide said electrical signal, said electrical signal operable to vary the width of said pulsing signal, and means responsive to said pulsing signal to provide said output electric energy to operate the electric drive means.

36. The apparatus of claim 35 wherein: the means to provide said electrical signal comprises light emitting means projecting light toward the means to sense the vacuum pressure, and means to sense light reflected by said means to sense the vacuum pressure and provide said electric signal.

37. A method of supplying a second fluid fuel to intake air used by an internal combustion engine having an intake manifold accommodating a first fluid fuel and an ignition means producing electrical energy pulses in timed relation to the speed of the engine comprising: introducing a second fluid fuel into intake air used by internal combustion engine, mixing a first fluid fuel with the second fluid fuel and air mixture to provide a first and second fluid fuel and air mixture, establishing an electrical signal proportional to vacuum pressure of gas in the intake manifold, and modulating the amount of the second fluid fuel introduced into the intake air in response to the product of the electrical energy pulses of the ignition means and said electrical signal proportional to vacuum pressure of gas in the intake manifold to maintain a substantially constant ratio of the first and second fluid fuels relative to each other and to air over the operating rpm of the engine.

38. the method of claim 37 wherein: the modulation of the amount of the second fluid fuel introduced into the intake air is responsive to the width of the electrical energy pulses, said electrical signal proportional to vacuum pressure operable to vary the width of the electrical energy pulses.

39. The method of claim 37 wherein: the electrical signal proportional to vacuum pressure of gas in the intake manifold is established by moving a member in response to changes in vacuum pressure relative to means for producing said electrical signal.

40. A method of supplying fluid to intake air used by an internal combustion engine having an intake manifold and ignition means producing electrical energy pulses in timed relation to the speed of the engine comprising: introducing fluid into intake air used by an internal combustion engine, establishing an electric signal proportional to vacuum pressure of gas in the intake manifold, and modulating the amount of fluid introduced into the intake air in response to the product of the electrical energy pulses of the ignition means and said electrical signal proportional to the vacuum pressure of gas in the intake manifold to maintain a substantially constant ratio of fluid to air over the operating rpm of the engine, said means for producing said electrical signal includes light sensing means, said electrical signal being varied in response to the amount of light sensed by said light sensing means thereby effecting the modulation of the amount of fluid introduced into the intake air.

41. A control for regulating the amount of electric energy supplied to an electric drive means that is responsive to a change in pressure of a gas and a varying frequency of electric energy pulses comprising: means for sensing changes in the pressure of a gas, said means having movable means that change position in response to a change in pressure of the gas, control means having first means operable to provide an electrical signal in response to a change in position of the movable means, and second means accommodating the electric energy pulses and electrical signal so that the width of the electric energy pulses is changed as a function of the electrical signal and providing output electric energy to operate the electric drive means as a function of the product of said electric energy pulses and the electric signal, said first means including light emitting means projecting light toward the movable means, and means to sense light reflected by the movable means and provide said electrical signal.

42. The control of claim 41 wherein: the means for sensing changes in the pressure of a gas is a diaphragm assembly having a flexible diaphragm movable in response to changes in the pressure of the gas, said movable means being connected to said diaphragm.

43. The control of claim 42 including: casing means having a chamber, and means to mount the diaphragm assembly on the casing means, said control means being located in the chamber of the casing means.

44. The control of claim 41 wherein: said second means is operable to produce a pulsing signal related to the electric energy pulses, said electric signal from the first means operable to vary the width of said pulsing signal as the pressure of the gas changes, and means responsive to said pulsing signal to provide said output electric energy.

45. The control of claim 44 wherein: the first means comprises light emitting means projecting light toward the movable means, and means to sense light reflected by said movable means and provide said electric signal proportional to the pressure of the gas.

46. The control of claim 45 including: casing means having a chamber, means mounting the means having movable means on the casing means, said first and second means being located in said chamber.

* * * * *